United States Patent
Ray et al.

(10) Patent No.: US 7,230,786 B1
(45) Date of Patent: Jun. 12, 2007

(54) METHOD AND APPARATUS FOR DYNAMIC PLACEMENT OF AN INTEGRATION WINDOW IN A DISK DRIVE HAVING A DISK SURFACE WITH SPIRAL SERVO INFORMATION WRITTEN THEREON

(75) Inventors: Bill Ray, Broomfield, CO (US); John VanLaanen, Louisville, CO (US); Bruce Liikanen, Berthoud, CO (US)

(73) Assignee: Maxtor Corporation, Scotts Valley, CA (US)

( * ) Notice: Subject to any disclaimer, the term of this patent is extended or adjusted under 35 U.S.C. 154(b) by 609 days.

(21) Appl. No.: 10/858,838

(22) Filed: Jun. 2, 2004

Related U.S. Application Data

(60) Provisional application No. 60/475,050, filed on Jun. 2, 2003, provisional application No. 60/475,129, filed on Jun. 2, 2003.

(51) Int. Cl.
 *G11B 21/02* (2006.01)
 *G11B 5/596* (2006.01)
(52) U.S. Cl. .................. 360/75; 360/77.11; 360/77.07
(58) Field of Classification Search .................. None
 See application file for complete search history.

(56) References Cited

U.S. PATENT DOCUMENTS

| | | | |
|---|---|---|---|
| 5,668,679 A | 9/1997 | Swearingen et al. | 360/75 |
| 5,793,559 A | 8/1998 | Shepherd et al. | 360/78.09 |
| 6,061,200 A | 5/2000 | Shepherd et al. | 360/77.04 |
| 6,115,203 A | 9/2000 | Ho et al. | 360/77.04 |
| 6,437,936 B1 | 8/2002 | Chen et al. | 360/77.04 |
| 6,549,362 B1 | 4/2003 | Melrose et al. | 360/77.04 |
| 6,985,316 B1 * | 1/2006 | Liikanen et al. | 360/29 |
| 7,002,761 B1 * | 2/2006 | Sutardja et al. | 360/29 |
| 7,019,937 B1 | 3/2006 | Liikanen et al. | 360/77.11 |
| 7,068,459 B1 * | 6/2006 | Cloke et al. | 360/75 |

OTHER PUBLICATIONS

U.S. Appl. No. 10/318,316, filed Dec. 11, 2002, Hargarten et al.
U.S. Appl. No. 10/859,068, filed Jun. 2, 2004, Ray et al.

* cited by examiner

*Primary Examiner*—Andrew L. Sniezek
(74) *Attorney, Agent, or Firm*—Fellers, Snider, et al.

(57) ABSTRACT

The present invention is directed to a method and apparatus for dynamic placement of an integration window in a disk drive having a disk surface with spiral servo information written thereon. A read head is provided for reading the spiral servo information and generating a read signal envelope. A repetitive spiral position error, associated with one spiral of the spiral servo information, is measured. Placement of an integration window is dynamically adjusted based upon the measured repetitive spiral position error, so that a read signal envelope read by the read head appears more towards the center of the integration window than if the placement of the integration window was not dynamically adjusted. By adjusting the placement of the integration window, dynamic range is increased without increasing the size of the integration window.

23 Claims, 10 Drawing Sheets

METHOD AND APPARATUS FOR DYNAMIC PLACEMENT OF AN INTEGRATION WINDOW IN A DISK DRIVE HAVING A DISK SURFACE WITH SPIRAL SERVO INFORMATION WRITTEN THEREON

CROSS-REFERENCE TO RELATED APPLICATIONS

Priority is claimed from U.S. Provisional Patent Application Ser. No. 60/475,050 filed Jun. 2, 2003, which is incorporated herein by reference in its entirety. Priority is also claimed from U.S. Provisional Patent Application Ser. No. 60/475,129 filed Jun. 2, 2003, which is also incorporated herein by reference in its entirety.

FIELD OF THE INVENTION

The present invention relates generally to data storage devices, such as disk drives. More particularly, the present invention relates to a method and apparatus for dynamic placement of an integration window in a disk drive having a disk surface with spiral servo information written thereon.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

FIG. 2 is a functional block diagram which illustrates a conventional disk drive 10 that is coupled to a host computer 33 via an input/output port 34. The disk drive 10 is used by the host computer 33 as a data storage device. The host 33 delivers data access requests to the disk drive 10 via port 34. In addition, port 34 is used to transfer customer data between the disk drive 10 and the host 33 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 above a desired track of the disk 12 and sensing the magnetic polarity transitions stored within the track, as the track moves below the transducer 20. Similarly, data is "written" to the disk 12 by positioning the transducer 20 above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$, for example, in response to an access command received from the host computer 33 via the interface 40 or in response to servo information read from the disk surface 12.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 33 into a write current signal that is delivered to the transducer 20 to "write" the customer data to an appropriate portion of the disk 12. As will be discussed in greater detail, the read/write channel 38 is also operative for continually processing data read from servo information stored on the disk 12 and delivering the processed data to the controller 36 for use in, for example, transducer positioning.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 (or wedges) that each cross the tracks 42 on the disk 12. The servo information in the servo spokes 44 is read by the transducer 20 during disk drive operation for use in positioning the transducer 20 above a desired track 42 of the disk 12. Among other things, the servo information includes a plurality of servo bursts (e.g., A, B, C and D bursts or the like) that are used to generate a Position Error Signal (PES) to position the write head relative to a track's centerline during a track following operation. The portions of the track between servo spokes 44 are used to store customer data received from, for example, the host computer 33 and are referred to as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of positioning the disk drive's write head at radial positions over the disk surface, so that servo information is written on the disk surface using the disk drive's write head with a high degree of positional accuracy.

In general, a STW is a very expensive piece of capital equipment. Thus, it is desirable that a STW be used as efficiently as possible during manufacturing operations. Even a small reduction in the amount of data needed to be written by the STW per disk surface can result in a significant cost and time savings.

A STW is used to write servo information, by controlling the position of the disk drive's write head, on a disk surface in a circumferential fashion at each radius at which the disk drive's write head is positioned. During drive operation, the servo information is used to position the transducer of the disk drive over the appropriate data track and data sector of the disk. Accordingly, as the number of tracks per inch (TPI) increases, the amount of time necessary to write servo information increases. That is, the number of circumferential passes that a STW must make over a disk surface increases as TPI increases. Thus, unless more STWs are supplied, manufacturing times will continually increase as the TPI increases.

Instead of using a STW to write servo information in a circumferential fashion at each radius, the assignee of the present invention presently uses a STW to write servo information in a spiral fashion (in at least some of its disk drives). Specifically, the STW moves the write head in a controlled manner (e.g., at a constant velocity or along a velocity profile) from the outer diameter of the disk to the inner diameter of the disk (or visa-versa) as the disk spins.

FIG. 4 is a diagrammatic representation of a disk surface 210 having a first spiral of servo information 215 written thereon. The dashed line, identified by reference numeral 220, represents a track. The first spiral of servo information 215 may make multiple revolutions around the disk surface 210 (roughly two revolutions as shown in FIG. 4), but only crosses track 220 once.

FIG. 5 is a diagrammatic representation of a disk surface 210 having a first spiral of servo information 215 and a second spiral of servo information 225 written thereon. As shown in FIG. 5, the first and second spirals 215, 225 are interlaced with one another and are written approximately 180 degrees apart. Again, each spiral crosses track 220 only once.

Additional spirals of servo information may be written on the disk surface 210 depending upon the servo sample rate (that is, the number of servo samples required for each track 220 to keep the disk drive's transducer sufficiently on-track). For example, if a servo sample rate of 120 equally-spaced servo sectors per track was required, 120 equally-spaced spirals may be written on the disk surface 110. Accordingly, by writing servo information in a spiral fashion, the time necessary to write servo information on disk surface 110 using the STW is a function of the servo sample rate (i.e., the number of spirals of servo information to be written) rather than the number of tracks.

FIG. 6 is a diagrammatic representation of a magnified view of a portion of FIG. 5 showing additional spirals of servo information (i.e., portions of four spirals are shown in FIG. 6). Furthermore, FIG. 6 is shown in a linear, instead of arcuate fashion, for ease of depiction.

At any given track 220 (Data Tracks 24-40 are depicted in FIG. 6), the disk drive's read head 230 (also referred to herein as the reader) will cross over the spirals of servo information at intervals equal to the sample rate. Furthermore, the read head 230 will cross over the spirals of servo information at an angle. Additionally, the number of spirals of servo information that cross each of the tracks 220 will be equivalent. For a given track 220, the spacing between adjacent spirals of servo information will be approximately equidistant.

It should be noted that a read head 230 placed on a track 220 closer to the inner diameter (ID) of the disk surface 210 will cross a given spiral of servo information at a time slightly delayed from a track 220 closer to the outer diameter (OD) of the disk surface. For example, suppose that: (1) time zero (t=0) is defined towards the right side of FIG. 6; (2) time increases in the figure from right to left along the horizontal; and, (3) the disk is rotating in the direction indicated by corresponding arrow shown in FIG. 6. If the read head 230 was placed above Data Track 26 at time zero and the disk was rotated, the read head 230 would cross Spiral 2 at a point later in time than if the read head 230 was placed on Data Track 37 under similar conditions, since Data Track 26 is closer to the inner diameter than Data Track 37.

Referring again to FIGS. 4 and 5, the spirals of servo information are written by moving the disk drive's write head using the STW in a generally radial direction (more accurately, in a radial direction along an arc due to the position of the bearing assembly), while both the disk is spinning and the write head is enabled. The direction of disk rotation is indicated by an arrow as shown in each of FIGS. 4 and 5.

The disk drive's write head is enabled for its entire stroke (i.e., from OD to ID or visa-versa) while under the control of the STW. As a result, a continuous spiral of servo information is written.

Each of the spirals of servo information includes sync marks written at fixed time intervals by the disk drive's write head. As mentioned above, the STW is used to move the disk drive's write head at some fixed velocity (or velocity profile) in a generally radial direction across the disk surface. If the time interval between sync marks is known and the velocity of the disk drive's write head is known, the distance between sync marks along a spiral can be determined. Specifically, the following formula may be applied: Distance=(STW Velocity)(Time), where Distance represents the radial distance between sync marks, STW Velocity represents the radial velocity of the disk drive's write head (under control of the STW) and Time represents the interval between sync marks.

For example, the interval between sync marks may be set at 1 microsecond, while the write head may be controlled to move at a radial velocity of 10 inches per second along its stroke. Thus, the radial distance between sync marks can be calculated to be 1 microinch along each spiral.

Each sync mark along a given spiral corresponds to a unique radius. Accordingly, the sync marks may be used to accurately position a transducer of a disk drive over the disk surface.

FIG. 7 is a diagrammatic representation of a magnified portion of one of the spirals of servo information shown in FIG. 6. FIG. 7 is intended to provide a representation of the track pitch (TP) of a circumferential data track and the reader width (RW). The spiral 700 is a continuous, single-frequency pattern having sync marks 702 embedded therein.

The sync marks 702 constitute phase shifts within the spiral pattern. In FIG. 7, the sync marks 702 are shown as regularly-spaced white areas within the spiral 700.

FIG. 8 is a diagrammatic representation of a read signal that is generated as the reader 230 reads a portion of a spiral of servo information while the disk is spinning. In FIG. 8, the x-axis represents time, while the y-axis represents signal amplitude. The depicted shape is known herein as the read signal envelope 802.

In general, the shape of each read signal envelope 802 will be approximately the same (e.g., roughly a football shape) over the entire disk surface. The position of the read signal envelope in time changes based upon the position of the reader 230. Although the read signal envelope moves relative to the position of the reader 230, the sync pattern within the spiral being read does not move. Accordingly, the envelope moves relative to the sync marks. Since the sync marks are at known radial positions, the sync marks provide a position reference.

A position error signal (PES) is determined by calculating the position of the reader relative to a known reference point (i.e., one of the sync marks) within the spiral servo pattern. The position of the reader is given by the centroid of the read signal envelope and is determined by integrating the read signal envelope over a hardware integration window of fixed-size (described in more detail below) to determine the read signal envelope's area (i.e., by performing a power integration) and, then, dividing by two. This is known as the half-integrator value.

A diagrammatic representation of an integration curve 902 in normalized units is shown in FIG. 9. The position of the reader is at 1.5 arbitrary units along the x-axis, where half of the integrated value of the read signal envelope is to the right of the position of the reader and half of the integrated value of the read signal envelope is to the left of the position of the reader.

As mentioned above, once the position of the reader is determined (i.e., by determining the half-integration value), the PES is determined by comparing the position of the reader relative to one of the sync marks. FIG. 10 is a diagrammatic representation illustrating five (5) sync marks in the read signal envelope.

To determine the time at which the half integrator value occurs, it is necessary to record the integration values at various sample points over the integration interval, wherein the integration interval is defined by the integration window. One convenient sample interval is the same as the sync mark-to-sync mark interval. This sample interval "frames" a sync mark and, therefore, is known as the frame interval (or frame). The spiral energy integration value is determined at each frame interval and accumulated, so that the time of the reader position can be calculated after the entire spiral has passed under the reader. An example of saved integrator values is shown in FIG. 11. It should be noted that the values in FIG. 11 do not correspond to the read signal envelope of FIG. 8. Instead, the values in FIG. 11 are based on an altogether different read signal envelope.

To reference the position of the reader relative to a sync mark, the time at which each occurs must be known. The time of the reader position is found by searching the array of integrator values to find the corresponding frame interval containing the half integrator value. Linear interpolation is used to find the exact time of the half-integrator value relative to one of the end points of the frame interval. The interpolation uses the saved integrator values on either side of the half-integrator value to compute a localized slope of the integrator around the head position. The localized slope calculation incorporates the change in integrator values over a known distance.

To reference the reader position to the known reference points in the spiral, the time is saved at which each sync mark is detected. Because the frame interval is the same as the sync- to-sync interval, a clock is started at the beginning of each frame to count the time from the beginning of the frame to when a sync mark is detected. This time may also be saved in an array similar to the integrator values. A computation is then performed to determine the difference in time from (1) the beginning of the frame interval to the reader position and (2) the beginning of the frame interval to the sync position. The difference in time is then scaled to position by the relationship between the sync-to-sync spacing of radius and time.

Once the reader position is referenced to a sync mark, a determination must be made as to whether the reader position and the sync mark are the desired, or targets, of the track following system. If the reader position is found to be 10% away from a sync mark, but the sync mark is actually 1 away from the target sync mark, then the sync to sync spacing must be added to the reader position to demodulate the full reader position. For example, if there were 4 sync marks per track, then the sync spacing is 25% of a track. If the reader position is found to be 10% away from a sync mark and the sync mark is 1 away from the target sync mark, then the position of the reader would be demodulated as 35% of a track away from the target location.

FIG. 12 is a schematic representation of an integration window 1202 and a read signal envelope 1204. The integration window 1202 is opened around the expected position of the read signal envelope 1204. The dynamic range of the system is defined by the integration window's width 1206 minus the width 1208 of the read signal envelope 1204. The system reaches the limits of its dynamic range when the read signal envelope 1204 begins to move outside of the integration window 1202.

In FIG. 12, the read signal envelope 1204 is centered in the integration window 1202. In such case, the position error signal (PES) would be zero.

FIG. 13A is a schematic illustration of a read signal envelope 1304 that is centered in the integration window 1302 (i.e. the PES should be zero). FIG. 13B is a schematic illustration of a curve representing accumulated integration values across the integration window, wherein each dot represents accumulated integration values at a frame.

In certain instances, repeatable runout (RRO) may be introduced into the servo system. For example, RRO may be introduced when the write head is not moved at its expected velocity across the disk surface during the spiral writing process. RRO may also be introduced when the spiral-to-spiral spacing is not identical at a particular radius or over the disk surface.

FIG. 14 is a schematic diagram illustrating an integration window 1202 and a read signal envelope 1204 that is shifted from the center of the integration window 1202 due to RRO 1410. As can be seen in FIG. 14, RRO 1410 can decrease the dynamic range over half of the integration window (i.e., the right-half of the integration window in FIG. 14).

Because it is inevitable that some RRO will be present (and for other reasons), it would be beneficial to increase the dynamic range of the system. This could be accomplished by increasing the size of the integration window. However, if the size of the integration was increased, the amount of noise in the integration window would increase, because the position of the reader is determined by integrating over the entire integration window and then dividing by 2.

Accordingly, it would be beneficial to increase the dynamic range of the system without increasing the size of the integration window (i.e., the period of time over which it is open), so as to avoid increasing the noise of the system.

SUMMARY OF THE INVENTION

The present invention is designed to meet some or all of the aforementioned, and other, needs.

The present invention is directed to a method and apparatus for dynamic placement of an integration window in a disk drive having a disk surface with spiral servo information written thereon. In one embodiment, a read head is provided for reading the spiral servo information and generating a read signal envelope. A repetitive spiral position error, associated with one spiral of the spiral servo information, is measured. Placement of an integration window is dynamically adjusted based upon the measured repetitive spiral position error, so that a read signal envelope read by the read head appears more towards the center of the integration window than if the placement of the integration window was not dynamically adjusted. By adjusting the placement of the integration window, dynamic range is increased without increasing the size of the integration window.

After demodulating a PES associated with a read head position relative to the spiral, an adjustment is made to the PES to account for adjustments made to the placement of the integration window.

Placement of integration windows may be dynamically adjusted for all of the spirals in the spiral servo information.

Other embodiments, objects, features and advantages of the invention will be apparent from the following specification taken in conjunction with the following drawings.

DETAILED DESCRIPTION OF THE PREFERRED EMBODIMENT

Figure 1:
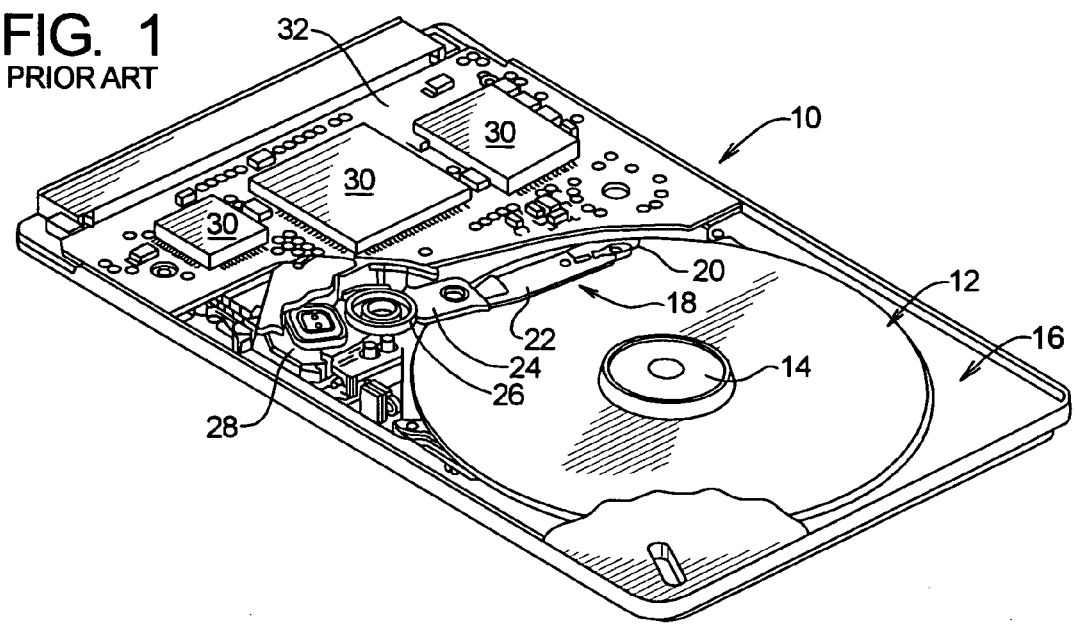
FIG. 1 is a diagrammatic representation illustrating a conventional disk drive with its top cover removed.
Figure 2:
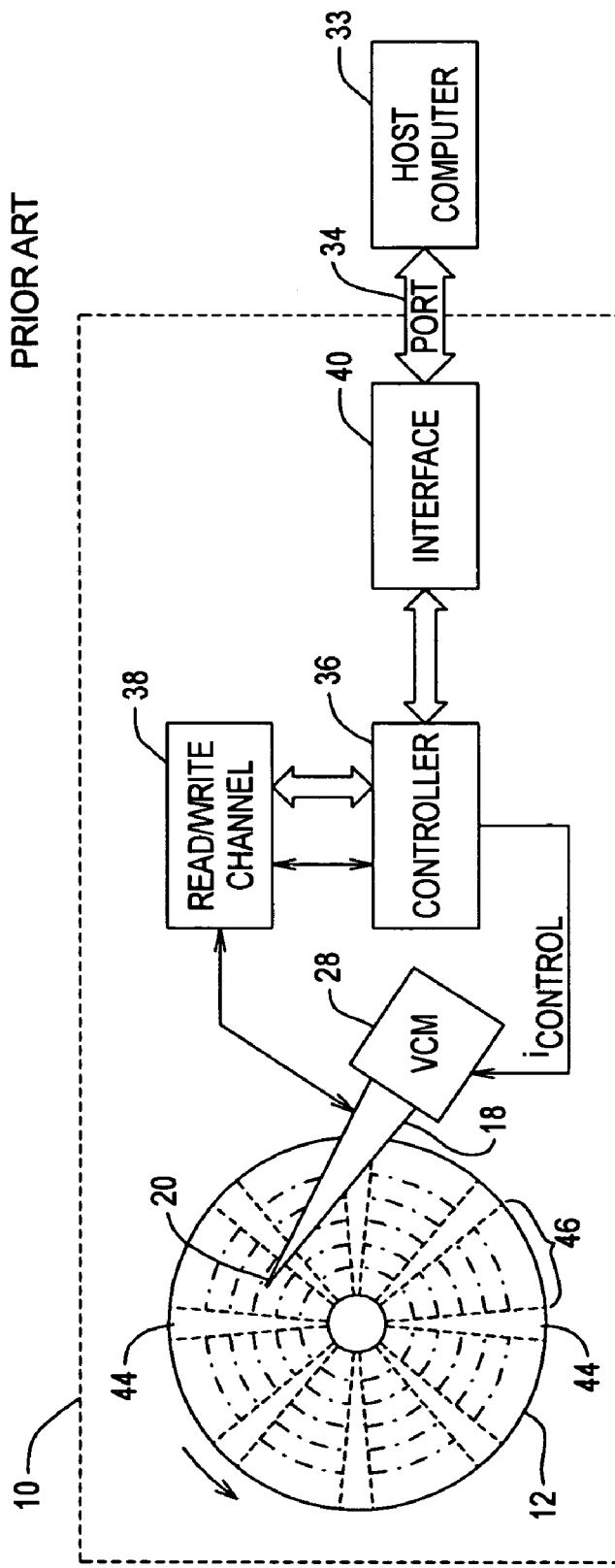
FIG. 2 is a functional block diagram which illustrates a conventional disk drive that is coupled to a host computer via an input/output port.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

In one prior system, integration windows are opened at static times (or, equivalently, placed at static locations), which ignores potential repetitive spiral position errors (or repeatable runout (RRO)) resulting from misplacement of spirals by the STW. If spiral servo information were perfectly placed by the STW, then static integration windows would be very effective, because read signal envelopes read by a read head would be positioned in the center of their corresponding integration windows when there was no position error.

The present invention dynamically places integration windows, such that a read signal envelope read by a read head is centered in the integration window based upon measured repetitive spiral position errors. Accordingly, the dynamic range of the system is increased without increasing the size of the integration window and, hence, without increasing the overall noise of the system.

Figure 15:
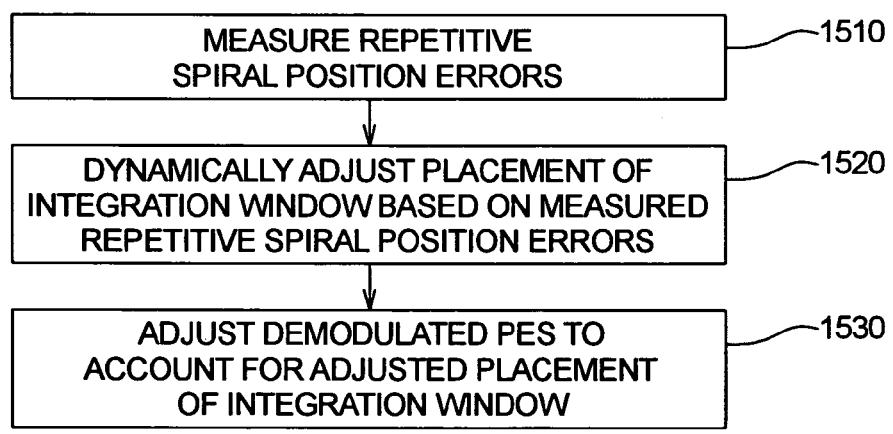
FIG. 15 is flowchart illustrating an embodiment of the present invention; and, FIG. 16 is a block diagram illustrating one method of measuring repetitive spiral position errors.

A flowchart of one embodiment of the present invention is presented in FIG. 15. In step 1510, repetitive spiral position errors are measured. The repetitive spiral position errors are introduced when the STW was used to write spiral servo information onto the disk surface. For example, the repetitive position errors may be due to some non-repeatable noise that becomes written into the spiral servo information on the disk surface. The position errors are repetitive at a particular location on the disk surface because they repeat at each revolution of the disk. In general, there is a coherency in repetitive position errors along a spiral. There are a variety of techniques of measuring repetitive spiral position errors and some of such techniques will be discussed in further detail at a later point in this disclosure.

Next, in step 1520, placement of the integration window (e.g., when, in time, the window is opened) is dynamically adjusted based on the measured repetitive spiral position errors. Preferably, the adjustment is such that a read signal envelope that is read by a read head is centered in the integration window, thereby increasing the dynamic range of the system. Furthermore, the adjustment is preferably made on a frame-by-frame basis.

For example, if at a particular radius, a spiral is found to have a repetitive position error equal to about two frames, the integration window would be adjusted by two frames (in an appropriate time or direction), so that the read signal envelope would be more likely to appear in the center of the integration window when the read head read such spiral. It should be understood that the repetitive position error may not be equal to a multiple of a frame. Accordingly, in one embodiment, the integration window is dynamically adjusted on a frame-by-frame basis to the closest frame corresponding to the repetitive position error.

Next, in step 1530, after demodulating a position error signal (PES) associated with a read head position relative to a spiral, an adjustment must be made to the PES to account for adjustments made to the placement of the integration window. As an example, assume, as above, that the integration window was adjusted by two frames. If the read signal envelope appeared exactly in the center of the integration window, normally the PES would be zero. That is, the read head would be considered to be on-track. However, because the integration window was adjusted by two frames, the read head would actually be off-track by the distance corresponding to two frames. Accordingly, the PES would need to be adjusted to account for the two-frame adjustment in the placement of the integration window.

Figure 16:
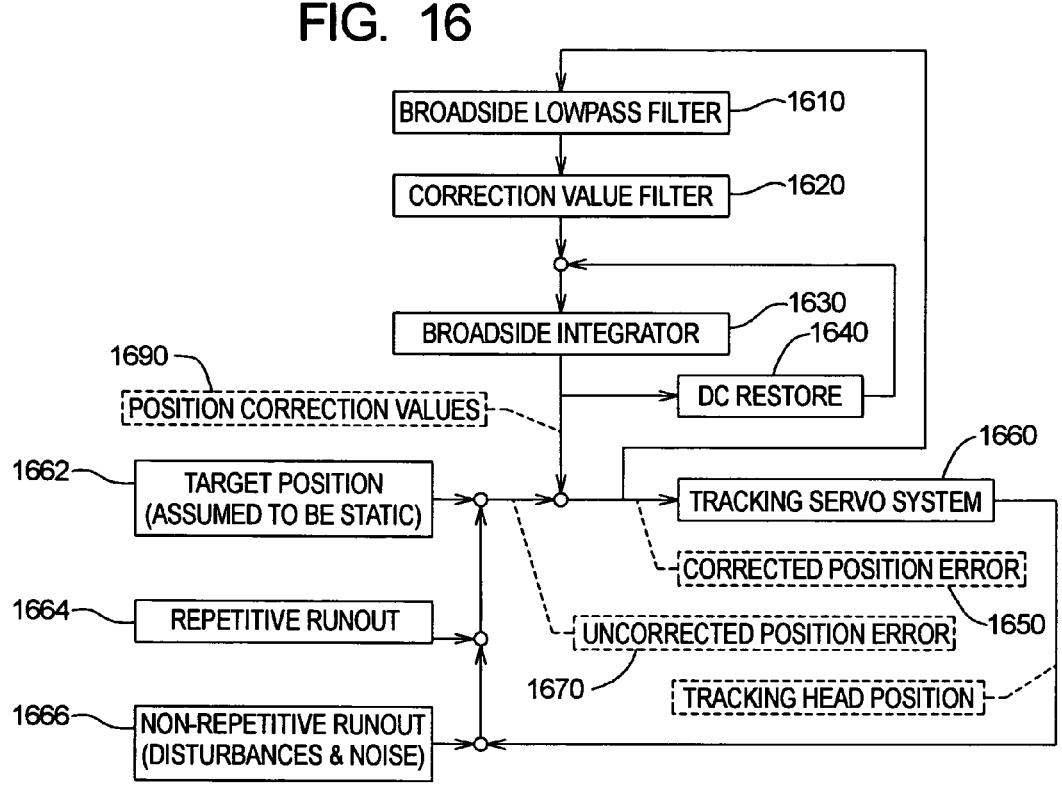

As mentioned above, there are a variety of techniques of measuring repetitive spiral position errors. FIG. 16 illustrates one such technique.

In FIG. 16, position correction values, which provide a measure of repetitive spiral position errors, are generated based upon PES history associated with individual spirals and knowledge of the system's error transfer function. Position correction values are continuously modified, via integration, while tracking, as opposed to recalculating the correction values at every track. This is accomplished by taking advantage of the high degree of correlation in the repetitive spiral position errors in neighboring tracks and, therefore, uses less processing time.

As shown in FIG. 16, position correction values are determined using a broadside low-pass filter 1610, a correction value filter 1620, a broadside integrator 1630 and a DC restore 1640. It should be noted that the broadside low-pass filter 1610 is optional.

The system generates position correction values with the same magnitude but opposite polarity as the repetitive runout signal. As mentioned above, the position correction values are a measure of the repetitive spiral position errors described in connection with FIG. 15. As described in FIG. 16, the position correction values are used to cancel out the contribution of the repetitive runout signal to the corrected position error signal. Position correction values can be used to dynamically adjust the placement of the integration window.

The broadside lowpass filter 1620 includes a bank of filters equal in number to the number of spirals observed in a revolution of the disk. Each filter in the bank lowpasses the corrected position error samples 1650 from a specific spiral. Consequently, the sample rate for these filters is the same as the period of the disk's rotation. Lowpassing the samples for each spiral individually reduces the high-frequency content, or variation, in the filter output for each spiral, as opposed to reducing the variation in a sequential stream of outputs. The net effect of the broadside lowpass filter 1610 is to suppress the non-repetitive runout portion of the signal, while presenting the repetitive runout related portion of the signal to the correction value filter 1620.

The correction value filter 1620 processes its input to compensate for the effects of the tracking servo system 1660 upon the loop's input signals (target position 1662, repetitive runout 1664, and non-repetitive runout 1666). Specifically, the tracking servo system 1660 modifies the input signals by 1/[1+T], where T represents the open loop gain of the tracking servo system, to form the uncorrected position error signal 1670. The tracking servo system 1660 also modifies the position correction values by 1/[1+T] as they become a component of the corrected position error signal 1650. Canceling the repetitive runout requires that the position correction values 1690 be equal to the repetitive runout samples, but opposite in sign. The repetitive runout related portion of the input to the broadside lowpass filter 1610 (or correction value filter 1620, if no broadside lowpass filter 1610 is provided) is scaled by 1/[1+T] by the tracking servo system 1660. Consequently, a scaling factor of [1+T] must be applied to recover the original repetitive runout samples. Accordingly, the correction value filter 1620 has a transfer function proportional to and approximating [1+T].

The broadside integrator 1630, like the broadside lowpass filter 1610, is a bank of integrators equal in number to the number of spirals observed in a revolution of the disk. Each integrator acts on an output of the correction value filter 1620 associated with a single spiral. The integrators accumulate estimates of the residual repetitive runout values that are at the output of the correction value filter 1620. Inevitably, the correction value filter 1620 does not exactly compensate for the effects of the tracking servo system 1660 and its outputs do not completely cancel the repetitive runout. This leaves residual repetitive runout in the corrected position error. The residual repetitive runout circulates back through the correction value filter 1610 to present new, and diminished, inputs to the integrators. While residual repetitive runout exists, the correction value filter will output non-zero results, and those results will be integrated to form better position correction values. As the position correction values converge to cancel the repetitive runout, the repetitive runout related portion of the input to the broadside integrator 1630 disappears, and the integrators hold their values. Over time, this system substantially removes repetitive runout from the corrected position error signal.

The DC restore 1640 operates to remove any DC, or offset, that may develop in the position correction values. The construction of the correction value filter 1620 attempts to eliminate any DC component at the filter's output (so that the position correction values average to zero about the revolution). However, physical implementations of both the correction value filter 1620 and the broadside integrator 1630 may result in the undesirable build up of an offset at the output of the broadside integrator 1630. The DC restore 1640 measures any such offset and subtracts a portion of it from the input to the broadside integrator 1630, effectively removing the offset over time.

The broadside lowpass filter 1610 of FIG. 16 can be removed to realize a simpler system, but with less non-repeatable runout rejection. As another alternative, the broadside integrator 1630 and DC restore 1640 could be removed to realize a simpler system, but with less repetitive runout rejection.

Position correction values provide a measurement of the repetitive spiral position errors. These position correction values are used to adjust the placement of the integration window to account for the repetitive spiral position errors.

There is a high degree of track-to-track correlation of the repetitive spiral position errors, which is a significant characteristic of spiral-based feedback. The highly correlated runout results in position correction values that change only slightly from track-to-track.

Figure 3:
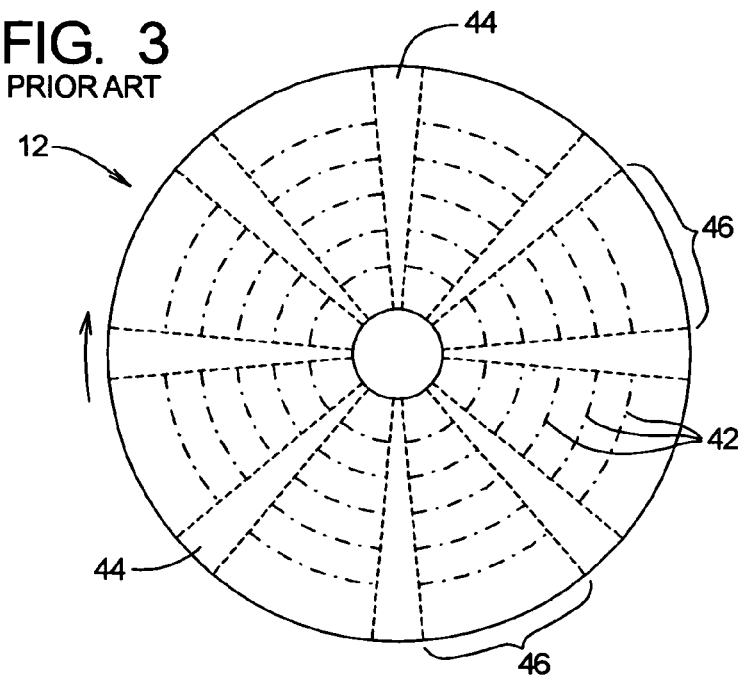
FIG. 3 is a diagrammatic representation of a top view of a magnetic storage disk illustrating a typical organization of data on a disk surface.
Figure 4:
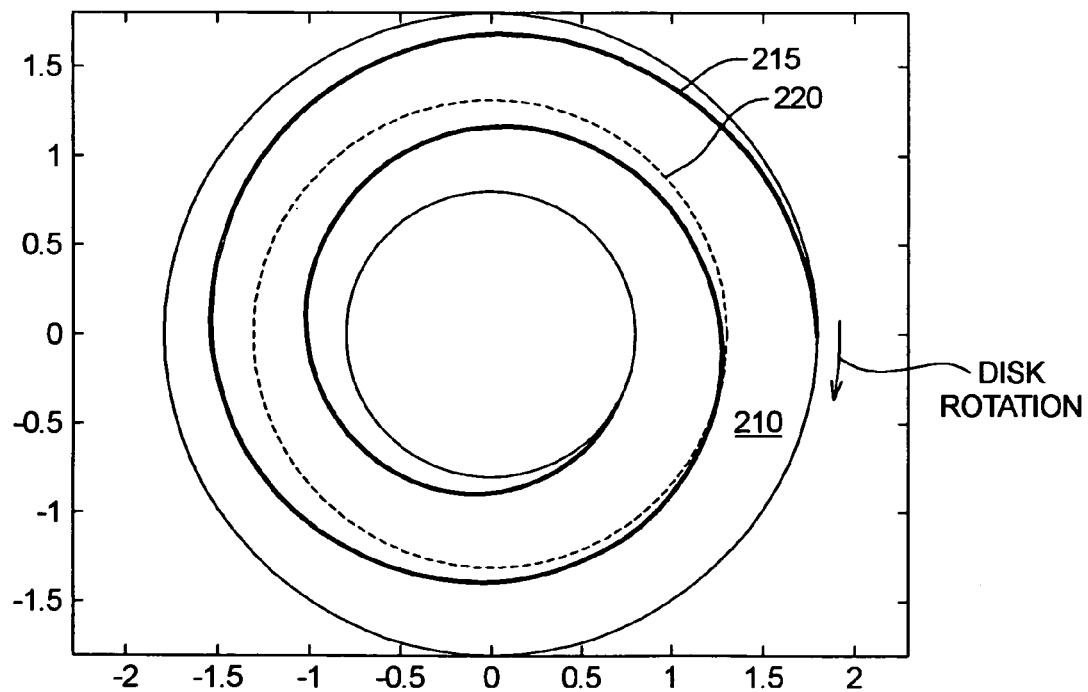
FIG. 4 is a diagrammatic representation of a disk surface having a spiral of servo information written thereon, along with a circular data storage track.
Figure 5:
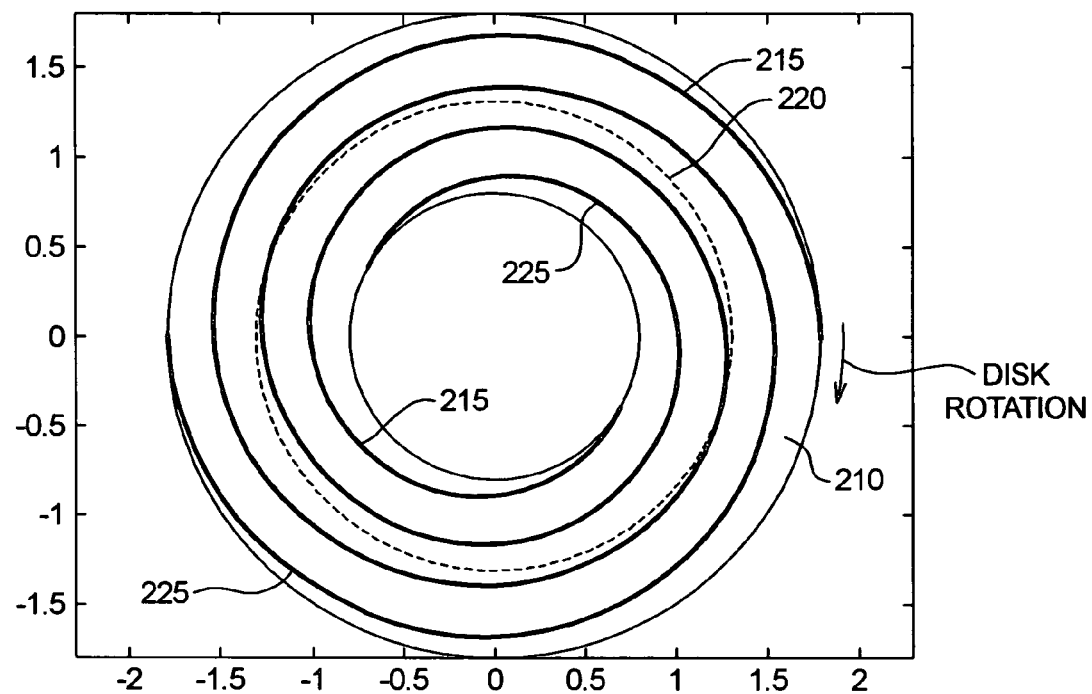
FIG. 5 is a diagrammatic representation of a disk surface having two spirals of servo information written thereon, along with a circular data storage track.
Figure 6:
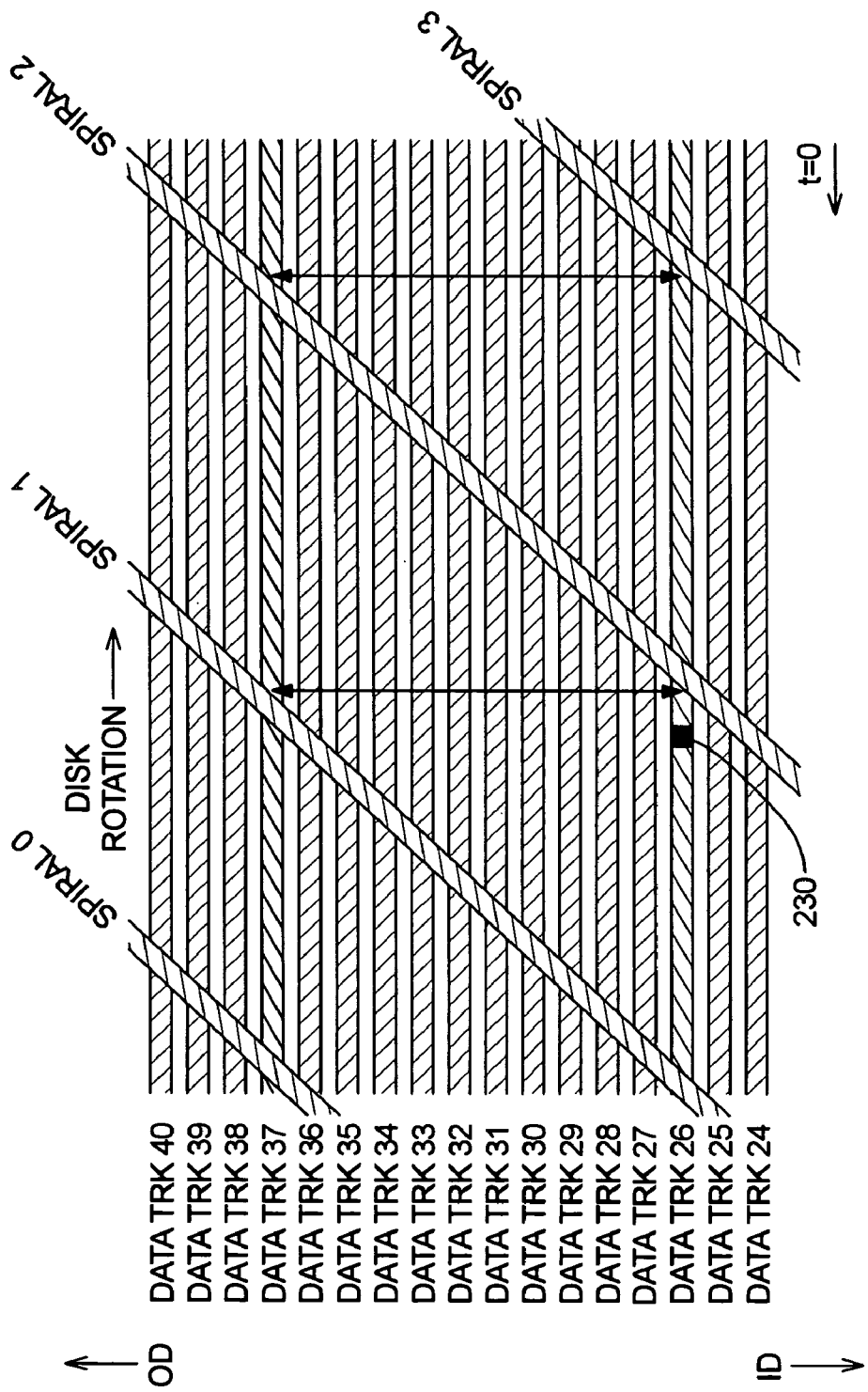
FIG. 6 is a diagrammatic representation of a magnified view of a portion of FIG. 5 showing additional spirals of servo information in a linear, instead of arcuate fashion, for ease of depiction.
Figure 7:
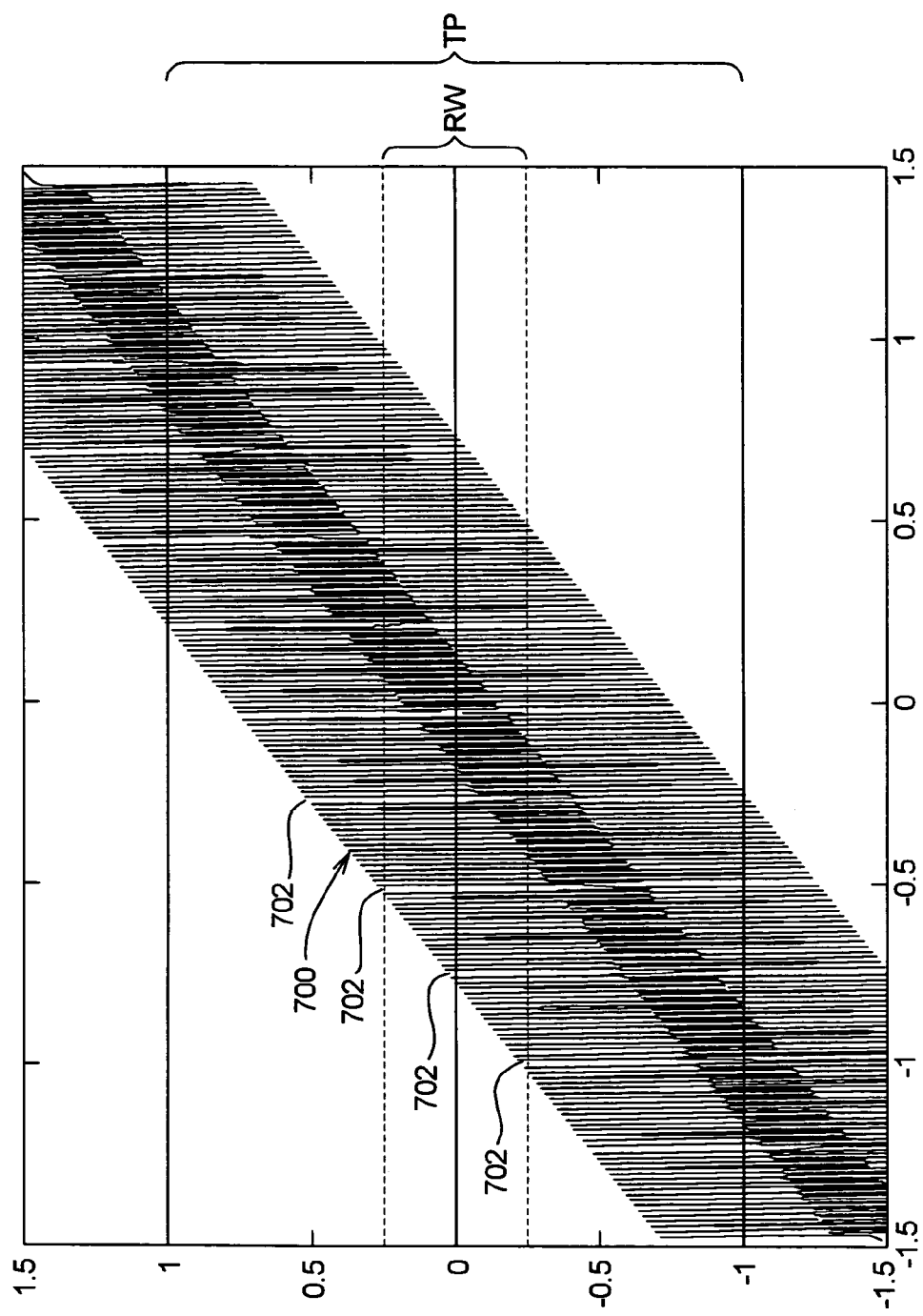
FIG. 7 is a diagrammatic representation of a magnified portion of one of the spirals of servo information shown in FIG. 6.
Figure 8:
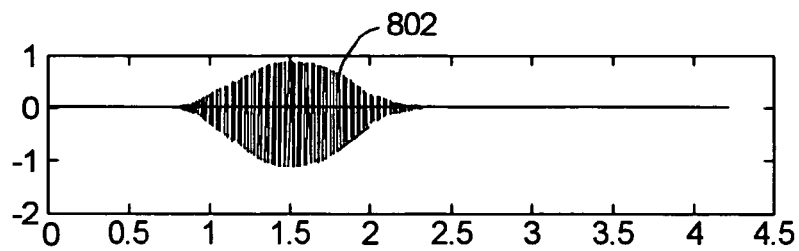
FIG. 8 is a diagrammatic representation of a read signal that is generated as the reader reads a portion of a spiral of servo information while the disk is spinning.
Figure 9:
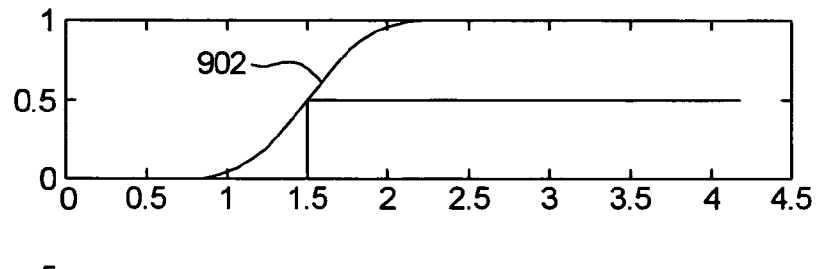
FIG. 9 is a diagrammatic representation of an integration curve in normalized units.
Figure 10:
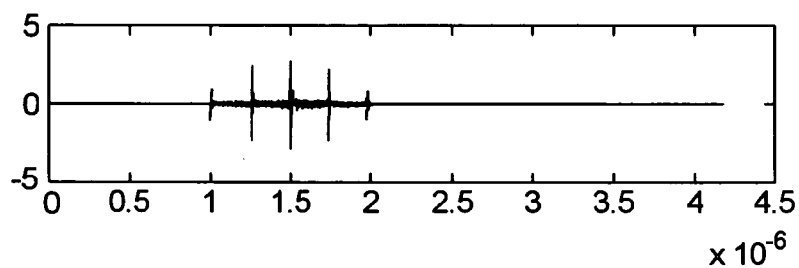
FIG. 10 is a diagrammatic representation illustrating five (5) sync marks in a read signal envelope.
Figure 11:
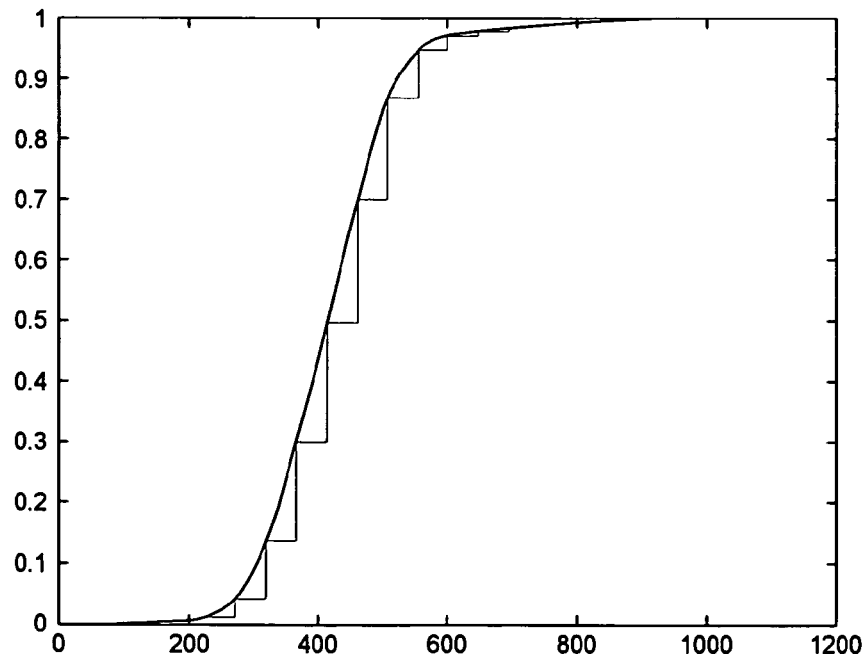
FIG. 11 is a diagrammatic representation of exemplary saved integrator values.
Figure 12:
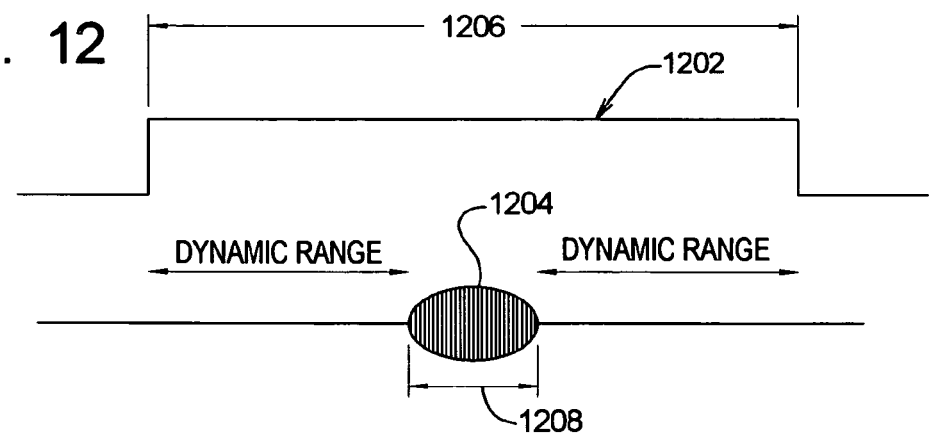
FIG. 12 is a schematic representation of an integration window and a read signal envelope, wherein the read signal envelope is centered in the integration window.
Figure 13A:
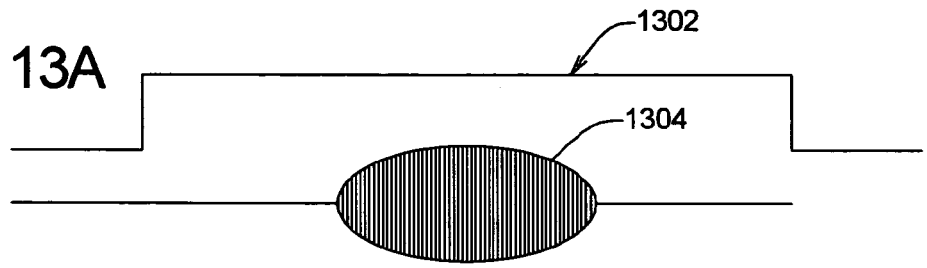
FIG. 13A is a schematic diagram illustrating a read signal envelope that is centered in an integration window.
Figure 13B:
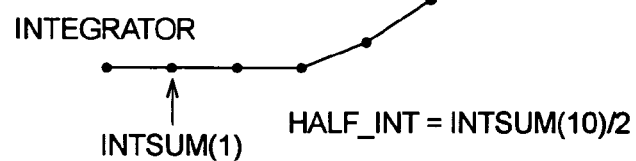
FIG. 13B is a schematic diagram illustrating a curve representing accumulated integration values across the integration window of FIG. 13A.
Figure 14:
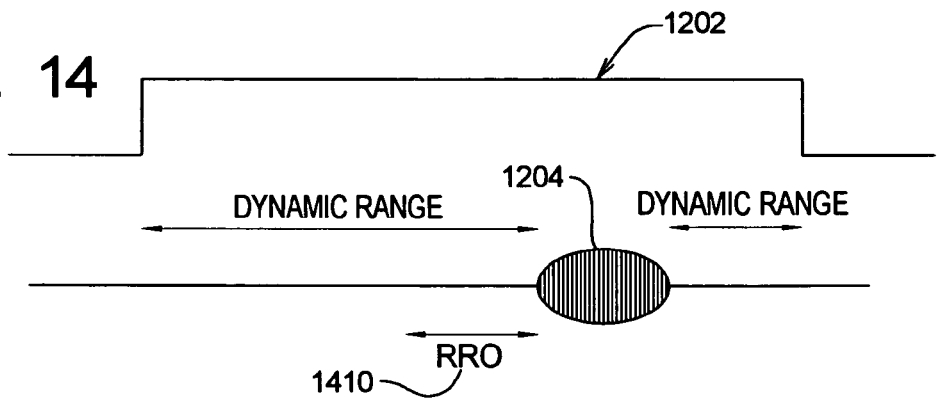
FIG. 14 is a schematic diagram illustrating an integration window and a read signal envelope, wherein the read signal envelope is shifted from the center of the integration window due to RRO.

Other techniques for measuring repetitive runout are known to those skilled in the art. For example, Maxtor Corporation has developed techniques for measuring and correcting repetitive runout by generating ERC (embedded runout correction) values. Similarly, Quantum Corporation measured and corrected repetitive runout by generating BCVs (burst correction values), while Digital Equipment Corporation generated SCNs (sector correction numbers). While many of these techniques were developed in connection with a disk surface formatted with embedded servo sectors (like that shown in FIG. 3), some of such techniques can be extended to spiral servo information, at least after reading the present disclosure.

For an example of some embedded runout correction techniques, reference is made to U.S. Pat. No. 6,115,203 to Ho, et al. entitled "Efficient Drive-Level Estimation of Written-In Servo Position Error" and U.S. Pat. No. 6,549,362 to Melrose, et al. entitled "Method and Apparatus for the Enhancement of Embedded Runout Correction in a Disk Drive", both of which are incorporated by reference in their entireties.

In one embodiment of the present invention, adjustments in the placement of the integration window are based upon measured repetitive spiral position errors, without using position correction values, in a positioning control system that did not incorporate a position correction system like that described in connection with FIG. 16. In such case, repetitive spiral position errors would be identified by filtering and/or averaging methods (like those described in U.S. Pat. Nos. 6,115,203 and 6,549,362, or any other ERC, BCV and SNC techniques and the like).

The assignee of the present invention has developed a technique for self-servo writing, whereby the disk drive writes servo information onto the disk surface using the spiral servo information that was written under control of the STW. After the disk surface has been self-servo written, the disk will be formatted in a manner similar to that shown in FIG. 3.

The present invention increases the range of repetitive spiral position errors over which a read signal envelope may be detected. This reduces the self-servo writing system's sensitivity to spirals misplaced by the STW, which results in an overall increase in the yield of the self-servo write process. When spiral misplacement is not taken into account, the read signal envelope may fall outside of the integration window, which can contribute to positioning errors and, ultimately, failure of the self-servo write process.

In one embodiment of the self-servo write technique, the STW is used to write two times the number of spirals required for a proper servo-sample rate. These spirals are divided into a first set of spirals and a second set of spirals. If consecutively numbering spirals at a particular radius on the disk surface, the first set of spirals would include even numbered spirals, while the second set of spirals would include odd numbered spirals.

It is important to note that the repetitive spiral position errors are likely to be different between corresponding spirals in the two sets of spirals. Accordingly, adjustments to the placement of the integration window will vary based upon the particular set of spirals on which the system is servoing. Therefore, in one embodiment, prior to switching from one set of spirals to the other set of spirals, the integration window is gradually placed at (or near) its non-adjusted position. Furthermore, after switching from one set of spirals to the other set of spirals, adjustments to the placement of the integration window are gradually applied.

In yet another embodiment, when initially making adjustments to the placement of the integration window (whether or not switching between a first set of spirals or a second set of spirals), such adjustments are gradually applied (for example, when the system is first turned on).

In one embodiment, one frame is equal to one STW step and four STW steps are equal to one gray code track. However, it should be understood that other relationships are possible and anticipated.

It should be understood that the present invention may be used in conjunction with self-servo writing using spiral servo information or only with spiral servo information (e.g., if the spiral servo information comprises the final servo pattern on the disk surface).

It should be understood that other demodulation techniques may be used, which do not require an integration window. In such techniques, for example, instead of providing an integration window, a gate may be used. Accordingly, the present invention is also intended to cover instances where gates are shifted (by frames, bits, time or otherwise), so that the spiral servo information read by the read head appears more towards the center of the gate.

It should be understood that the present invention may be based in either time and/or position.

It should also be understood that the present invention is preferably based entirely in firmware and/or software.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
providing a disk surface and a read head associated with the disk surface, said disk surface having spirals of servo information written thereon;
measuring a repetitive spiral position error associated with one of the spirals of servo information;
dynamically adjusting placement of an integration window based upon said measured repetitive spiral position error.

2. The method of claim 1 wherein the integration window is placed such that a read signal envelope read by the read head appears more towards the center of the integration window than if the placement of the integration window was not dynamically adjusted.

3. The method of claim 1 wherein the integration window is of a fixed length.

4. The method of claim 1 further including the step of:
storing a value associated with the adjusted placement of the integration window in memory.

5. The method of claim 1 wherein placement of the integration window is adjusted on a frame-by-frame basis.

6. The method of claim 1 wherein the dynamic adjustment is gradually applied.

7. The method of claim 1 wherein the dynamic adjustment is less than the measured repetitive spiral position error.

8. The method of claim 1 wherein the dynamic adjustment is gradually removed.

9. The method of claim 8 wherein the dynamic adjustment is gradually removed while servoing on a first set of spirals, but prior to servoing on a second set of spirals.

10. The method of claim 1 wherein dynamic adjustment of the integration window increases dynamic range relative to no dynamically adjustment of the integration window.

11. The method of claim 1 further including the step of:
after demodulating a position error signal (PES) associated with a read head position relative to the spiral, adjusting the PES to account for adjustments made to the placement of the integration window.

12. A method comprising the steps of:
providing a disk surface and a read head associated with the disk surface, said disk surface having spirals of servo information written thereon;
measuring repetitive spiral position errors associated with a plurality of the spirals of servo information;
on a spiral-by-spiral basis, dynamically adjusting placement of integration windows based upon said measured repetitive spiral position errors.

13. The method of claim 12 wherein the integration window is placed such that, for the plurality of spirals, corresponding read signal envelopes read by the read head appear more towards the center of the integration windows associated with each of the plurality of spirals than if placement of the integration windows was not dynamically adjusted.

14. The method of claim 12 wherein the integration windows are of a fixed length.

15. The method of claim 12 further including the step of:
storing values associated with the adjusted placement of the integration windows in memory.

16. The method of claim 12 wherein placement of the integration windows is adjusted on a frame-by-frame basis.

17. The method of claim 12 wherein the dynamic adjustment is gradually applied.

18. The method of claim 12 wherein the dynamic adjustment is less than the measured repetitive spiral position error.

19. The method of claim 12 wherein the dynamic adjustment is gradually removed.

20. The method of claim 19 wherein the dynamic adjustment is gradually removed while servoing on a first set of spirals, but prior to servoing on a second set of spirals.

21. The method of claim 12 wherein dynamic adjustment of the integration windows increases dynamic range relative to no dynamically adjustment of the integration windows.

22. An apparatus comprising:
a disk surface having spiral servo information written thereon;
a read head associated with the disk surface, wherein said read head is used to read said spiral servo information;
circuitry for measuring a repetitive spiral position error associated with one of the spirals of servo information;
circuitry for dynamically adjusting placement of an integration window based upon said measured repetitive spiral position error, so that a read signal envelope read by the read head appears more towards the center of the integration window than if the placement of the integration window was not dynamically adjusted.

23. The apparatus of claim 22 further including:
circuitry for adjusting a position error signal (PES) to account for adjustments made to the placement of the integration window after demodulating a PES associated with a read head position relative to the spiral.

* * * * *